United States Patent [19]

Ostermann et al.

[11] Patent Number: 4,686,251

[45] Date of Patent: Aug. 11, 1987

[54] METHOD FOR MAKING DECORATIVE RESIN-WOOD COMPOSITES AND THE RESULTANT PRODUCT

[75] Inventors: Michel E. Ostermann, Chateauneuf sur Isere; Etienne M. Meriaux, Bourg les Valence, both of France

[73] Assignee: Societe Anonyme: Boxy Industries, France

[21] Appl. No.: 759,370

[22] Filed: Jul. 26, 1985

[30] Foreign Application Priority Data

Jul. 27, 1984 [FR] France ................. 84 12174

[51] Int. Cl.⁴ .......... B27N 3/02; B27M 3/04; C08L 63/00
[52] U.S. Cl. ................. 523/448; 264/109; 264/122; 264/271.1
[58] Field of Search .......... 264/122, 109, 271.1; 523/448

[56] References Cited

U.S. PATENT DOCUMENTS 2,993,014 7/1961 Schardt ............... 521/109.1
3,981,840 9/1976 Yamamoto ............ 523/303

FOREIGN PATENT DOCUMENTS 2102721 4/1972 France .
2245495 7/1978 France .
1315788 5/1973 United Kingdom ......... 264/109

*Primary Examiner*—Philip Anderson
*Attorney, Agent, or Firm*—Bacon & Thomas

[57] ABSTRACT

The invention relates to the production of decorative panels. The process for production according to the invention is characterized in that:
 an epoxy resin which is liquid and polymerizing at ambient temperature in the presence of a polymerization reagent having the least reactive character at the same temperature,
 fragments and/or pieces of wood previously heated to a homogeneous temperature higher than the peak temperature of exothermia of polymerization of the resin-reagent mixture,
are used. The invention is more particularly applicable to the manufacture of decorative trays for tables.

9 Claims, 5 Drawing Figures

METHOD FOR MAKING DECORATIVE RESIN-WOOD COMPOSITES AND THE RESULTANT PRODUCT

The present invention relates to the production of products of decorative nature adapted to be used as sheets, strips, panels, blocks, particularly for the decoration of premises or dwellings.

Although not especially limited to this application, the invention relates more particularly to the recovery and use of fragments or pieces of raw or machined wood coming from forestry workings or raw wood transforming and machining industries.

One proposal for recovering and using such products for such purposes has already been recommended, particularly by French Pat. No. 71 38306 (2 113 222).

This Patent envisages the possibility of making a decorative panel by placing in a mould branches or twigs embedded in a mass of plastics material, equally well of thermo-setting or thermo-plastic nature. The very general teaching given by this document cannot be considered as contributing the information necessary and sufficient for the man skilled in the art to carry out such a technique.

In fact, a finished product would be obtained by employing the means recommended therein, which could not be marketed by reason of the defects that it presents.

The first is the inclusion in the plastics material of bubbles of different sizes which destroy the aesthetic appearance of the product and are also detrimental to its mechanical characteristics.

The second is due to the fact that cutting from a moulded block, to obtain plates for example, reveals that the wood waste or chips are, at least in part, impregnated in their channels with resin. The contrast of colours and the aesthetic appearance due to the essence and veins of the included products are considerably altered thereby, and permanently so.

A third defect lies in the fact that most of the plastics materials recommended have a high coefficient of shrinkage during the hardening phase. Such shrinkage constrains the waste or chips to the point of deteriorating them by causing tear, bursting and/or fragmentation thereof. Such shrinkage is also responsible for internal stresses producing an appreciable deformation of the finished product which most often necessitates an important machining operation to give it a suitable outside appearance. Such internal stresses are also responsible for splits, cleavages, etc . . . in the mass of hardened plastics material and sometimes for a break in bond between the resin and the included pieces.

It is precisely an object of the invention to provide the technical means necessary and sufficient to make it possible to produce, from fragments and/or pieces of wood and an appropriate plastics material, decorative products of certain aesthetic character, having no defects nor deformations and obtained by limiting the consumption or use of the quantity of plastics material.

To attain the purpose set forth hereinabove, the process of production according to the invention is characterized in that:

a liquid epoxy resin polymerizing at ambient temperature in the presence of a polymerization reagent having the least reactive character at the same temperature, fragments and/or pieces of wood previously heated to a homogeneous temperature higher than the peak temperature of exothermia of polymerization of the resin-reagent mixture, are used.

A further object of the invention is any decorative product obtained from the process set forth hereinabove.

BRIEF DESCRIPTION OF THE DRAWINGS

The process according to the invention consists in making a decorative product, of any appropriate form, by using fragments and/or pieces of wood placed (FIG. 1A) in a mould and embedded or submerged (FIG. 1B) in a mass of plastics material contained in such a mould. As shown in FIGS. 1A and 1B, the wood fragments 1 are placed in mold 2 and a resin 3 is poured into the mold to submerge the wood fragments contained therein. Fragments and/or pieces are understood to mean waste, chips and/or pieces of raw or machined wood. The ratio of the volume occupied by the fragments and/or pieces with respect to that of the mould may be variable. In certain cases, the fragments and/or pieces may be disposed to be placed in the close vicinity, if not in partial contact, by their peripheral surface.

Figure 1A:
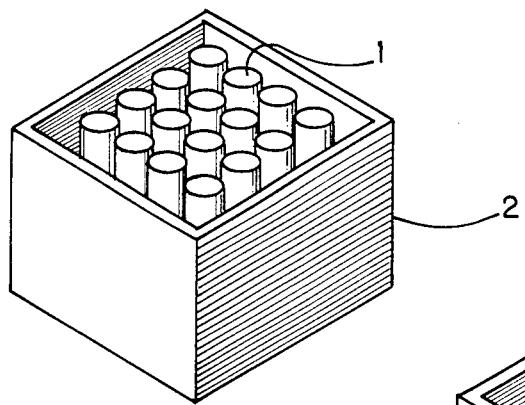
FIG. 1A is a perspective view of a mold containing fragments of wood in accordance with the process of this invention.
Figure 1B:
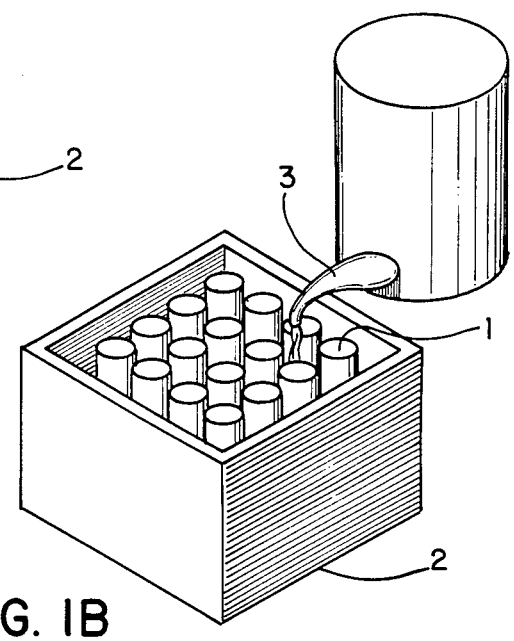
FIG. 1B is a perspective view of the mold containing fragments of wood and being filled with a curable liquid epoxy resin in accordance with the process of this invention.

The fragments and/or pieces may be of different shapes and be placed without any preferred direction or, on the contrary, be aligned in a privileged direction for specific aesthetic or mechanical reasons.

According to the invention, the plastics material is constituted by a material which is thermosetting at ambient temperature and, in this family, an epoxy resin fluid at ambient temperature of which the process of polymerization occurs in the presence of one or more catalysts or one or more hardening agents. According to the invention, the hardening agent is also chosen to have a character the least reactive possible at ambient temperature.

Such a raw material is known to produce, during the polymerization phase, an exothermic reaction raising its temperature under conditions depending on the mass of plastics material, on the conformation of the volume that it occupies and on the existing exchange surface.

Such a rise in temperature is naturally also applied to the included materials. This temperature has for its effect to expand the gasses included in these materials and to provoke evacuation thereof in the surrounding medium constituted by the resin. This exothermic reaction is responsible for the presence of included bubbles and internal tensions, and, moreover, for the absorption by the fibers of at least part of the resin, detrimental to or altering the aesthetic appearance of the included products.

In order to overcome this drawback, the invention recommends employing a resin which is liquid at ambient temperature and capable of polymerizing, likewise at ambient temperature, as soon as it is placed in the presence of its polymerization reagent or reagents. To this end, an epoxy resin and a hardening agent, marketed under the trademark RBS by the firm T2L CHIMIE, are perfectly suitable.

According to another arrangement of the invention, fragments and/or pieces of wood having a homogeneous temperature which is at least equal to and preferably greater than the peak temperature of the exothermia of polymerization, are used. In this way, during submersion of the fragments and/or pieces in the resin, the included gasses are not subjected to any expansion and remain confined in the cells that they occupy by the peripheral pressure exerted by the resin.

In practice, according to the invention, the exothermia of polymerization is limited by natural or forced ventilation, so as also to reduce the pre-heating temperature of the fragments and/or pieces. As the exothermia of polymerization may attain relatively high peaks, for example from 80° to 150° C., a controlled cooling makes it possible to limit the temperature of the wood to a value sufficiently low to avoid possible deterioration thereof and also to reduce the consumption of energy for cooling. This phase of maintenance of temperature is conducted for example in a range between −10° and +20°. According to the process, pre-heating of the wood is then effected up to a homogeneous temperature, at least equal to, but preferably higher than that of the controlled maintenance of temperature which is conducted by placing the filled mould in a chamber, in an enclosure or in premises allowing a cooling to be maintained capable of absorbing the calories produced by the exothermia of polymerization, in order that this polymerization may be initiated and developed without the fragments or pieces having to undergo a temperature greater than their initial temperature.

Consequently, the gas or gasses included in the materials are not subjected to an expansion responsible for the inclusion of bubbles within the plastics material.

The absence of evacuation of the included gasses makes it possible also to limit the dehydration of the fragments or pieces and to eliminate, in this way, the internal stresses.

Figure 2:
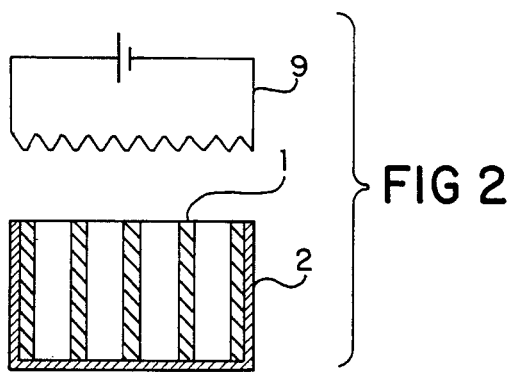
FIG. 2 is a cross sectional view of the wood fragments and resin within the mold being elevated to a slightly higher temperature during a second stage of polymerization in accordance with the process of this invention.

According to the invention, it is provided to maintain the mould-resin-wood assembly during a first phase of polymerization, at a constant temperature to attain the state of gelling or pre-hardening of the plastics material. In a second stage, according to the process of the invention, the mould-resin-waste assembly is subjected (FIG. 2) to a slightly higher temperature in order to promote the second phase of polymerization leading to the final state of hardening. A heating means 9 is shown in FIG. 2.

In this way, by carrying out the process according to the invention, it becomes possible to obtain and make decorative products of any desired shapes, bereft of bubbles included in the resin and having undergone no internal stress or tension capable of altering the aesthetic appearance of the fragments and/or pieces and of splitting or deforming the mass of resin including them.

The absence of transfer and of evacuation of the included gasses makes it possible to isolate the different channels or cells and thus to avoid penetration of the resin. This has two positive consequences. The first is the absence of spots visible in the sections of fragments and/or pieces when, for example, a block produced according to the process is then cut up into plates.

The second resides in the fact that the production of a decorative block or product involves only filling the volume of the mould reserved for the plastics material and thus limits the use or consumption of a basic product whose cost is higher than that of the fragments and/or pieces.

It should be noted that the fragments and/or pieces are not previously treated before submersion thereof. These fragments and/or pieces consequently present, on the surface, rough parts, hollows or open cells which are, at least in part, filled with resin during filling of the mould therewith in the fluid state. The resulting polymerization has for its effect to harden these inclusions and consequently to produce a perfect anchoring establishing an intimate bond between the resin and the wood, without this resin having been able to penetrate deeply in the cells of the sub-jacent layers to the point of altering the aesthetic character of the included products. This results in a high overall coherence, giving the product obtained good characteristics of mechanical strength, as well as good possibilities of machining or surfacing.

Different embodiments of the object of the invention are given hereinafter:

EXAMPLE 1

| | |
|---|---|
| Mould made of laminated material: dimensions | 200 × 200 × 30 |
| Epoxy resin RBS, hardening agent RBS | T2L CHIMIE |
| Waste of ash tree | |
| Resin-wood ratio | 40/60 |
| Prior heating of wood | 35° C. for 30 mins. |
| thickness of casting | 25 mm |
| Temperature of the resin cast | 20° C. |
| Ambient temperature ventilated on the moulded piece limited to | 10° C. for 30 mins. |
| Temperature of end of polymerization limited to | 40° C. for 24 hrs. |

Figure 3:
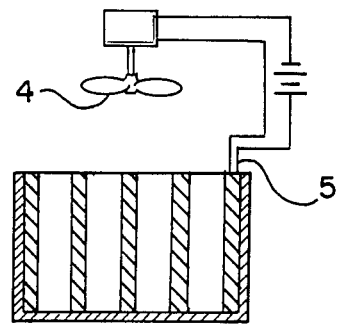
FIG. 3 is a cross sectional view of the wood fragments and resin contained within the mold being ventilated in accordance with the process of this invention.

The beginning- and end-of-polymerization phases are conducted by means of a forced ventilation installation of which operation depends on a heat probe which assesses more particularly the temperature of the plastics material. In FIG. 3 a fan 4 provides the ventilation and a heater probe 5 is used to assess the temperature of the material in the mold.

Figure 4:
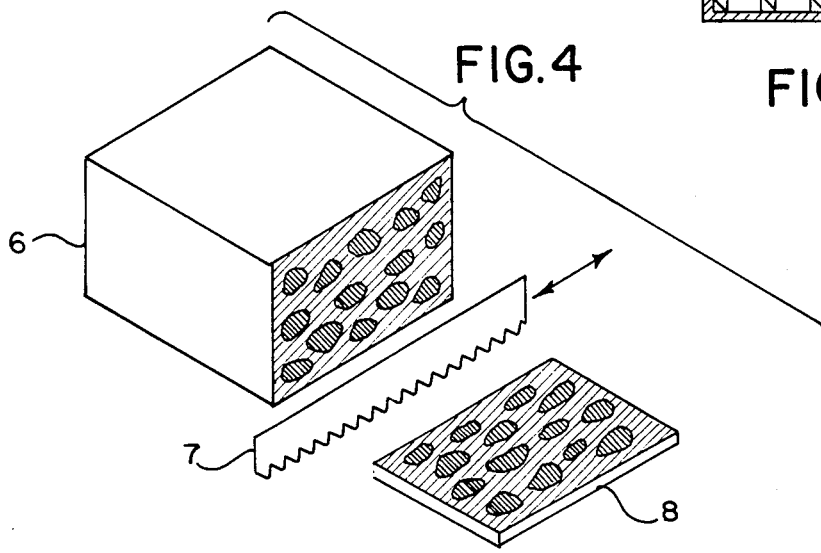
FIG. 4 is a perspective view which illustrates the cutting of the cured wood resin composite formed in accordance with the process of this invention.

The new block of product obtained may be cut up into plates or panels (FIG. 4) presenting, after surface machining and polishing, a smooth, flat surface state, showing sections of wood bereft of infiltration of resin, of internal stresses or fractures and intimately bonded to the resin coating itself bereft of bubbles, stresses or deformation. FIG. 4 shows a block of cured resin-wood fragment composite 6 which is cut by means of a saw 7 into thin sections such as that shown by reference numeral 8.

EXAMPLE 2

| | |
|---|---|
| Mould made of steel sheet thickness: 2 mm | 500 × 1000 × 55 |
| Resin RBS, hardening agent RBS | T2L CHIMIE |
| Waste of oak and pine | 50% each |
| Initial heating of wood | 40° C. for 30 mins. |

| | |
|---|---|
| Resin-wood ratio | 30/70 |
| Thickness of casting in mould | 40 mm |
| Initial temperature of resin | 20° C. |
| Phase 1: | |
| Strongly ventilated ambient temperature | 0° C. for 2 hours |
| Phase 2: | |
| Ventilated ambient temperature | 10° C. for 8 hrs. |
| Phase 3: | |
| End of polymerization temperature | 40° C. for 24 hrs. |

EXAMPLE 3

| | |
|---|---|
| Mould made of steel sheet thickness: 2 mm | 500 × 500 × 55 |
| Resin RBS, hardening agent RBS | T2L CHIMIE |
| Waste of ash tree | |
| Initial heating of wood | 100° C. for 15 mins. |
| Resin-wood ratio | 30/70 |
| Thickness of casting | 25 mm |
| Initial temperature of resin | 0° C. |
| Phase 1: | |
| Strongly ventilated ambient temperature | 25° C. for 2 hrs. |
| Phase 2: | |
| End-of-polymerization temperature | 40° C. for 24 hrs. |

Among numerous applications, the process may be carried out for obtaining plates directly issuing from moulding or resulting from a cut-out and polishing and used for forming panels for wall decoration or trays for the table.

The invention is not limited to the embodiments described, as various modifications may be made thereto without departing from the scope thereof.

We claim:

1. An improved process for making decorative resin-wood composites; said process being of the type wherein pieces or fragments of wood are submerged in an exothermically polymerizable resin within a mold to form a resin-wood composite; and the resin is exothermically cured whereby the heat of exothermia during polymerization causes substantial heating of the composite; wherein the improvement comprises the steps of: using a liquid epoxy resin and maintaining the temperature of the composite during exothermic polymerization at about ambient temperature; said resin being polymerized in the presence of a polymerization reagent having the least reactive character at the same ambient temperature.

2. The method of claim 1, wherein the improvement further comprises the step of heating the wood to a homogeneous temperature before submerging it into the resin; said temperature being at least as high as the peak temperature of exothermia at which the resin is maintained during polymerization.

3. The method of claim 2, wherein the wood is heated to a temperature which is higher than the peak temperature of exothermia.

4. The method of claim 3, wherein a resin is maintained at about ambient temperature by ventilating the resin during polymerization.

5. An improved process for making decorative resin-wood composites; said process being of the type wherein pieces or fragments of wood are submerged in an exothermically polymerizable resin within a mold to form a resin-wood composite; and the resin is exothermically cured whereby the heat of exothermia during polymerizing causes substantial heating of the composite; wherein the improvement comprises the steps of: (a) using a liquid epoxy resin which is polymerizable at ambient temperature and polymerizing the resin in the presence of a polymerization reagent having the least reactive character at the same temperature; and cooling the composite during the polymerization to a temperature which at its peak will prevent gas in the wood from forming bubbles in the resin; (b) using pieces of wood, previously heated before submersion, to a homogeneous temperature which is higher than the peak temperature attained by the resin during the cooling.

6. The process of claim 5, wherein the cooling is conducted so that the temperature of the resin is increased in a plurality of steps during the polymerization.

7. The process of claim 6, wherein the peak temperature attained in the first step is between −10° C. and +20° C.

8. A product constituted by a mass of polymerized epoxy resin and fragments of included wood obtained by the process of claim 1, wherein the product is substantially free of bubbles in the resin.

9. A product constituted by a mass of polymerized epoxy resin and fragments of included wood obtained by the process of claim 2, wherein the product is substantially free of bubbles in the resin.

* * * * *